Figure 4:
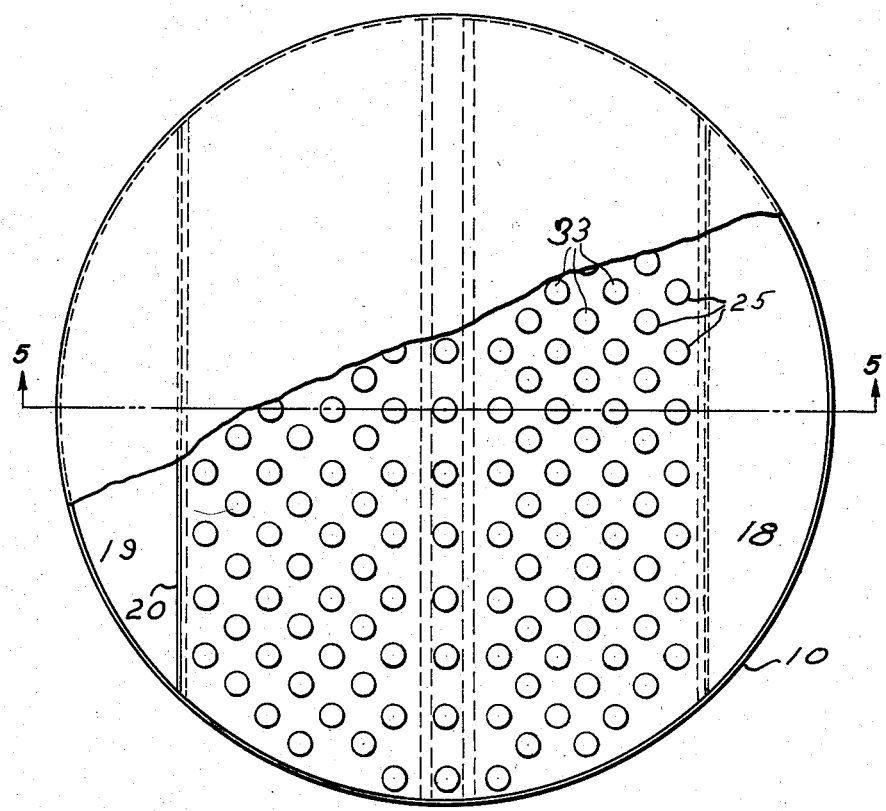

March 24, 1953 N. C. TURNER 2,632,638
GAS AND LIQUID CONTACT APPARATUS
Filed March 26, 1949 2 SHEETS—SHEET 1
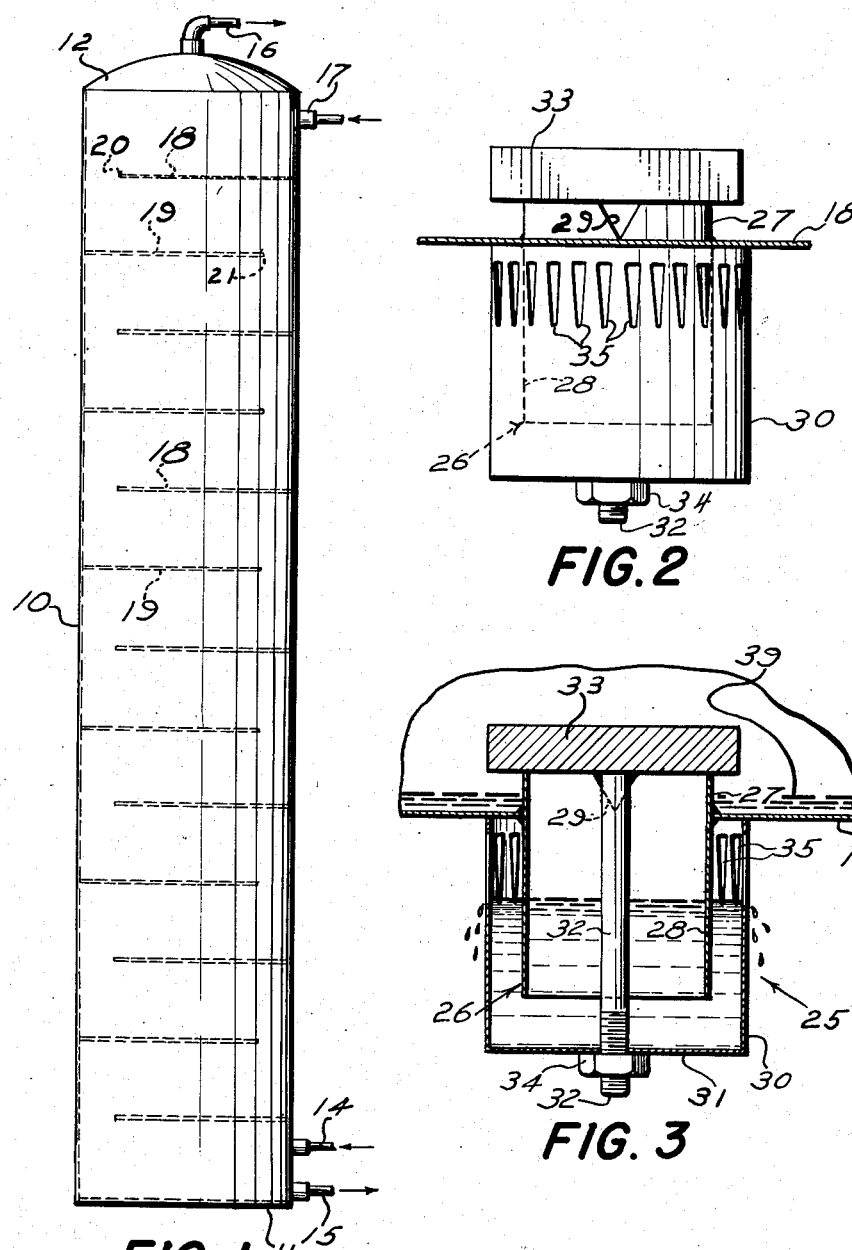
Nelson C. Turner
INVENTOR.
BY Browning & Simms
ATTORNEYS March 24, 1953      N. C. TURNER      2,632,638
GAS AND LIQUID CONTACT APPARATUS
Filed March 26, 1949      2 SHEETS—SHEET 2

Nelson C. Turner
INVENTOR.

BY Browning & Simms

ATTORNEYS

Patented Mar. 24, 1953

2,632,638

UNITED STATES PATENT OFFICE 2,632,638

GAS AND LIQUID CONTACT APPARATUS

Nelson C. Turner, Houston, Tex., assignor to Hudson Engineering Corporation, Houston, Tex., a corporation of Texas Application March 26, 1949, Serial No. 83,609

3 Claims. (Cl. 261—114)

This invention relates to gas and liquid contact apparatus, and refers more particularly to a contact apparatus capable of handling a relatively large quantity of liquid without reduced efficiency.

A type of gas and liquid contact apparatus in present use is known as a bubble tower and includes a tower having a plurality of trays extending in alternation from opposite sides of the tower, the free edge of each of the trays being provided with an upwardly extending flange or weir to maintain a depth of liquid on the trays and provided with a depending flange extending downwardly to the level of liquid on the tray below. In operation, the liquid introduced at the top of the tower flows downwardly from tray to tray in a zig-zag course. The gas introduced under pressure at the bottom of the tower is prevented from taking a zig-zag course by the depending flanges and is forced to go through a plurality of openings in the trays and bubble through the liquid thereon. The liquid is prevented from going down through the openings in the trays by trap constructions which usually consist of tubular members extending upwardly from the openings in the trays to a position above any expected liquid level on the tray, and a bubble cap over each tubular member spaced therefrom and having downturned edges below the upper end of the tube.

While this bubble tray type of gas and liquid contact apparatus of the prior art is generally satisfactory in operation, it has been found that when the rate of introduction of liquid introduced into the tower is increased beyond rather a low figure, the efficiency of the apparatus decreases sharply and the gas-liquid contact is not complete. This is due to the fact that an increased depth of liquid on the trays increases the hydrostatic resistance to the gas bubbling up through the trap devices on the trays, thereby reducing the amount of gas coming in contact with the liquid. An excess of liquid may actually stop the operation of the apparatus. The efficiency is also impaired by the fact that the surface of the liquid on the trays, under such overload conditions, is not level, there being a greater depth of liquid on the sides of the trays where liquid falls from the tray above. The gas therefore tends to bubble through the trap devices located near the free edges of the trays where the hydrostatic resistance is the lowest. The result is an inadequate amount of contact between the liquid and gas.

In some applications it is necessary to bring gas in contact with a relatively large quantity of liquid. In this case, the size of the contact apparatus tower is determined by the amount of liquid to be handled rather than by the amount of gas. The diameter of the tower of a prior art apparatus has to be doubled in order to double the length of the weirs on the trays and thereby provide twice the liquid handling capacity. Doubling the size of a tower multiplies by several times the cost of manufacture and erection. It is therefore the general object of this invention to provide a gas and liquid contact apparatus capable of handling a much larger quantity of liquid than a conventional apparatus of the same physical size.

It is another object to provide a gas and liquid contact apparatus which automatically permits an increased flow of liquid therethrough without loss of efficiency.

It is a further object to provide a gas and liquid contact apparatus requiring a minimum pressure drop thereacross to force the gas therethrough.

It is a further object to provide a gas and liquid contact apparatus which may be constructed using presently available standard parts.

It is a further object to provide an apparatus which, having no moving parts, is not subject to wear and breakdowns.

In pursuance of these and other objects which will be apparent to those skilled in the art, a tower is provided having a plurality of trays extending in alternation from opposite sides to provide a zig-zag path. A gas outlet and a liquid inlet is provided near the top of the tower and a gas inlet and liquid outlet is provided adjacent the bottom. The free edge of each tray is provided with an upwardly extending flange or weir to maintain a depth of liquid on the tray and permit the excess, if any, to flow over the flange or weir to the tray below. Each tray has a plurality of trap devices thereon permitting a dispersed flow of liquid downwardly through the tray but preventing the upward flow of gas therethrough. The gas is forced to take a tortuous zig-zag course around the alternately extending edges of the trays. The space between the trays is filled with a grossly porous liquid filming structure having a large surface area for dispersing the liquid falling therethrough and facilitating extensive contact with the gas. The porous structure preferably consists of a great number of Raschig rings casually disposed in the space between the trays.

Figure 5:
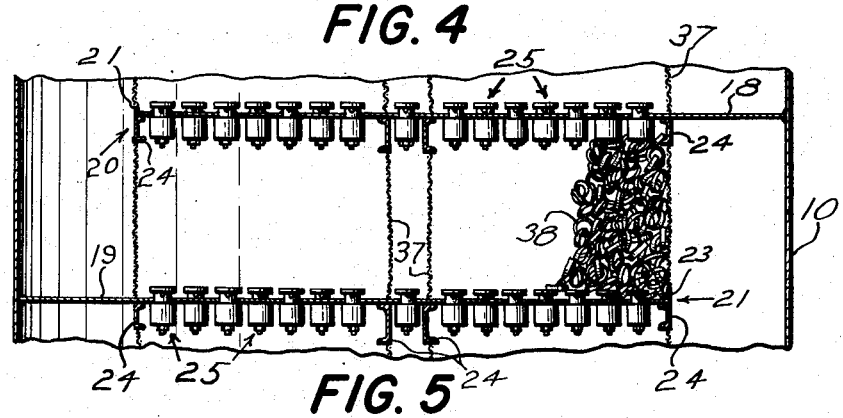

For a better understanding of the invention, reference is had to the following description taken with the appended drawings, showing a presently preferred embodiment of the invention, wherein:

Figure 1 is a side elevation of the exterior of a gas and liquid contact tower, the trays being represented by dotted lines, Figure 2 is a side elevation of a trap device upon an enlarged scale, a fragment of the tray being shown in section, Figure 3 is a sectional view of the device shown in Figure 2 taken on a vertical plane through the center, liquid being shown on the tray and in the trap device to illustrate its mode of operation, Figure 4 is a top plan of the tower, a part of the top being broken away to show the top tray and its many trap devices, and Figure 5 is a fragmentary sectional view taken in a vertical plane on the line 5—5 of Figure 4 in the direction of the arrows and showing the trap devices on the trays and the Raschig rings casually disposed between the trays.

Referring now in greater detail to the drawings, a cylindrical tower or tank 10 has a bottom 11 and a top 12. A gas inlet 14 and liquid outlet 15 are located near the bottom of tower 10. A gas outlet 16 and a liquid inlet 17 are located near the top of the tower. A plurality of trays 18 extend from one side of the tower 10 and a plurality of trays 19 extend from the other side of the tower. The trays 18 and 19 are alternately arranged to provide a tortuous zig-zag course for the gas and for the overflow liquid. As shown to advantage in Figures 4 and 5, the trays generally conform in outline with the cylindrical tower with their conforming edges sealed thereto, but have straight extended edges 20 and 21 forming, with the walls of tower 10, segment shaped openings. The edges 20 and 21 are provided with upwardly extending flanges or weirs 23 which serve to prevent overflow of fluid from the trays so long as the same has a depth not greater than the height of the flanges or weirs. The excess of liquid spilling over a flange or weir drops to the tray below. The trays 18 and 19 are firmly supported by channel-shaped bars 24 secured at their ends to the walls of tower 10.

The portion of each tray centrally located within the tower is provided with a plurality of trap devices generally designated at 25. Each trap device includes a cylindrical member or conduit or chimney 26 sealed as by welding in a conforming aperture in the tray. A minor portion 27 of the cylindrical member 26 extends above the tray 18 and a major portion 28 depends therefrom. The top edge of the cylindrical member 26 is notched at 29 to provide a V-shaped weir for the entrance into the member 26 of a stream of liquid as will be subsequently explained.

A cup 30 of larger diameter and depth than the depending portion 28 of member 26 is arranged to surround the portion 28. The bottom 31 of the cup 30 is centrally apertured to accommodate a bolt 32. The bolt 32 may be a T-bolt with cross head 33 of sufficient size to cover and close the upper end of the cylindrical member 26 leaving only the notch or weir 29 open for the entrance of liquid. A nut 34 on bolt 32 holds the top edge of cup 30 firmly against the under side of tray 18. The cup 30 is provided with a plurality of V-shaped openings 35 arranged around the cup near the upper edge thereof. It will be noted that the lowermost portion of openings 35 are at a level considerably above the lower edge of the cylindrical member 26 to provide a trap preventing the passage of gas upwardly through the tray 18 via the openings 35 and the weir 29.

Screens 37 of wire mesh are secured in vertical planes between the supporting channel bars 24 of the trays 18 and 19 to provide chambers which are filled with a grossly porous material 38 having large surface area for dispersing or filming the down-dripping liquid and yet permitting the passage therethrough of the gas. The porous material preferably consists of a plurality of Raschig rings casually disposed in the chambers defined by the trays and the screens 37. The Raschig rings may, for example, each be merely a short annulus of metal two inches or thereabouts in diameter. The liquid falling on the rings tends to be dispersed over a large area presenting an extensive surface for contact with the gas. It is also contemplated that a plurality of horizontally disposed and somewhat spaced perforated plates may be employed and are desirable because they offer less resistance to gas flow and provide a large filming surface.

By reference to Fig. 5, two intermediate screens 37 are shown. Where the zig-zag side-to-side passage of gas is to be employed, in accordance with the main description, these center screens may be omitted. The center screens 37 are shown to indicate the manner in which the apparatus may be modified to provide for split flow through the tower, as will be understood by those skilled in the art. Of course, the center section of tray 19, between the center screens, would have to be omitted, for split flow, and the peripheral edge opening adjacent weir 23 would be closed. Also, weirs 23 would be provided at each edge of the center opening. In addition, tray 18 would have to be modified by providing an opening at each peripheral edge of the tray similar to the opening shown at the left-hand end of the tray as shown in Fig. 5.

In operation, liquid is admitted through inlet 17 at the top of the tower 10, the liquid falling on tray 18 spreads out over the tray and flows downwardly through notch openings or weirs 29 into the trap devices 25. Weirs 29 provide a means for uniformly distributing the drainage of liquid through each of the plurality of downcomers or traps. As the rate of flow of liquid to a tray increases, it will result in a raising of the liquid level on the tray, but the effective size of the notches 29 also increases to speed up the drainage of liquid through each downcomer. If the liquid, by chance, rises above weir 21, the liquid will overflow the weir, but normally this will not occur. The liquid falling on tray 19 spreads out thereon in the same manner, any excess liquid, which because of the limited capacity of the weirs 29, does pass into the trap devices 25, goes over the flange 23 to the tray below. Liquid flows into the trap devices 25 through notches 29, down through cylindrical members 26 and up between the cups 30 and the members 26 to the openings 35. The liquid spills out of the openings all around the cups 30 in a plurality of small streams and falls downwardly to the Raschig rings 38 where it is further dispersed. The liquid flowing over flanges or weirs 23 and the liquid passing through traps 25 ultimately reach the bottom of the tower 10 and flow out through outlet 15. Any liquid flowing over the flanges 23 is contacted to some extent by the gas as it falls to the next lower tray, and in no event will it interfere with the flow of gas through the tower or the normal contact of that gas with the liquid which flows through the traps 25 in the intended manner.

At the same time that liquid is introduced at the top of the tower, gas is introduced under pressure into the bottom of the tower through inlet 14. The gas is prevented from passing upwardly through the traps 25 in the trays because, as shown in Figure 3, the openings 35 are above the bottoms of cylindrical members 26 and the liquid in the bottoms of the traps provides a seal between the members 26 and the cups 30. The gas is therefore forced to take a tortuous zig-zag course back and forth around the trays extending in alternation from opposite sides of the tower. In so doing, the gas passes through the interstices of the casually disposed Raschig rings between the several trays. Intimate contact is thus achieved between the gas and a large surface area of liquid.

It will be noted that as the amount of liquid applied to the tower through inlet 17 is increased to the capacity limit of the apparatus, there is no decrease of operating efficiency, but rather an increase in efficiency. When the level of liquid on the trays increases, there is an increased hydrostatic pressure at the notch openings 29 and an increased amount of liquid flows through the traps in the trays. There is no tendency for the gas to buck the downward moving liquid and decrease the rate of flow of the liquid or the gas.

It is apparent that a gas and liquid contact apparatus has been provided which is capable of handling a very large relative quantity of liquid. The apparatus may be embodied in a tower of considerably smaller size than would be possible with prior art devices. The efficiency of operation of the apparatus is not impaired by the introduction of an excess of liquid thereto.

While one embodiment of the invention has been shown and described in detail, it is to be understood that this has been done for purposes of illustration and not by way of limitation. It is accordingly desired that the appended claims be given a broad interpretation commensurate with the scope of the invention within the art.

The invention having been described, what is claimed is:

1. In a tower apparatus for providing intimate contact between a liquid and a gas, said tower having inlet and outlet openings for the introduction and withdrawal of liquid and gas, an apertured tray sealingly supported in the tower except for one edge and adapted to be supplied with liquid, a flange on said unsealed edge of the tray to maintain a depth of liquid on the tray and permit the excess to pass over the flange, a cylindrical member sealed in each aperture in the tray and extending above and below the tray, a weir in the portion of the cylindrical member above the tray and extending to a level below that of the upper edge of said flange, a cup non-sealingly surrounding the portion of the cylindrical member below the tray and provided with liquid outlets above the level of the bottom of the cylindrical member, a fastening member having an extended head engaging the top end of the cylindrical member and a threaded end extending through the bottom of the cup, and a nut screwed on said threaded end to hold the cup firmly in place, whereby liquid is allowed to disperse downwardly through the tray and gas is forced to go around the tray.

2. For use in a tray of a liquid and gas contact apparatus, trap means for permitting the downward flow of liquid and preventing the upward flow of gas comprising a conduit sealed in an aperture in the tray, a portion of the conduit extending above the tray, said portion having V-shaped notches to permit the entrance of liquid into the conduit, a cup non-sealingly surrounding the depending portion of the conduit with its upper end adapted to abut said tray and provided with V-shaped liquid exits located above the level of the lower end of the conduit, and fastening means securing the cup about the lower end of the conduit comprising a bolt carried by and extending longitudinally of said conduit with one end attachable to said cup.

3. The apparatus of claim 2 wherein said bolt has a head in abutment with the upper end of said conduit.

NELSON C. TURNER.

REFERENCES CITED

The following references are of record in the file of this patent:

UNITED STATES PATENTS

| Number | Name | Date |
| --- | --- | --- |
| 730,627 | Esser | June 9, 1903 |
| 815,031 | Newhall | Mar. 13, 1906 |
| 909,650 | Newhall | Jan. 12, 1909 |
| 1,141,266 | Raschig | June 1, 1915 |
| 1,212,199 | Eustis | Jan. 16, 1917 |
| 1,562,009 | Straus | Nov. 17, 1925 |
| 1,624,793 | Mann | Apr. 12, 1927 |
| 1,744,543 | Grace | Jan. 21, 1930 |
| 1,865,818 | Berryman | July 5, 1932 |
| 2,052,532 | Parsons | Aug. 25, 1936 |
| 2,191,919 | Thayer | Feb. 27, 1940 |